United States Patent
Taylor et al.

(10) Patent No.: US 8,007,709 B2
(45) Date of Patent: Aug. 30, 2011

(54) SYNCHRONIZED TEMPERATURE CONTOL OF PLASTIC PROCESSING EQUIPMENT

(75) Inventors: Bruce F. Taylor, Worthington, OH (US); Robert Kadykowski, New Richmond, OH (US)

(73) Assignee: Xaloy, Incorporated, New Castle, PA (US)

( * ) Notice: Subject to any disclaimer, the term of this patent is extended or adjusted under 35 U.S.C. 154(b) by 144 days.

(21) Appl. No.: 12/229,204

(22) Filed: Aug. 20, 2008

(65) Prior Publication Data

US 2009/0056856 A1 Mar. 5, 2009

Related U.S. Application Data

(60) Provisional application No. 60/966,378, filed on Aug. 27, 2007, provisional application No. 60/966,495, filed on Aug. 28, 2007.

(51) Int. Cl.
*H05B 6/02* (2006.01)

(52) U.S. Cl. .......... 264/472; 264/486; 425/144; 425/174

(58) Field of Classification Search ................. 425/144, 425/174; 264/472, 486
See application file for complete search history.

(56) References Cited

U.S. PATENT DOCUMENTS

| | | | |
|---|---|---|---|
| 2,436,993 A | 3/1948 | Fisher, Jr. | |
| 3,472,987 A | 10/1969 | Viart | |
| 3,640,662 A * | 2/1972 | Schwartz | 425/174.8 R |
| 3,698,844 A * | 10/1972 | Grimm | 425/144 |
| 3,727,678 A | 4/1973 | Schott, Jr. | |
| 3,870,445 A * | 3/1975 | Hold et al. | 425/144 |
| 4,088,430 A * | 5/1978 | Giles | 425/144 |
| 4,183,448 A * | 1/1980 | Nash | 222/63 |
| 4,319,871 A * | 3/1982 | McAlister | 425/376.1 |
| 4,384,514 A | 5/1983 | Larivé et al. | |
| 4,548,341 A | 10/1985 | Hambleton | |
| 4,642,043 A | 2/1987 | Schwarzkopf | |
| 4,678,420 A * | 7/1987 | Inoue | 425/144 |
| 4,726,751 A | 2/1988 | Shibata et al. | |
| 4,940,870 A | 7/1990 | Shibata et al. | |

(Continued)

FOREIGN PATENT DOCUMENTS

CN 2774753 2/2005

(Continued)

OTHER PUBLICATIONS

Changsha Joy Great Science and Technology, *Electromagnetism heating coil introduction*, (downloaded from www.eh2005.com.cn), website registered Jan. 4, 2007, 29 pgs., Hunan Province Changsha China.

*Primary Examiner* — Joseph Del Sole
*Assistant Examiner* — David N Brown, II
(74) *Attorney, Agent, or Firm* — Robert J. Herberger (57) ABSTRACT

A system for processing plastic feed material includes a machine having a barrel and a screw that rotates in a repetitive cycle in the barrel. An induction winding encircles and extends along an outer surface of the barrel. A control system includes a controller that determines a duty cycle referenced to a length of the machine cycle in response to an error between a desired barrel temperature and a current barrel temperature. The controller electrically connects the power supply to the induction winding at least once during each cycle for a period whose length corresponds to the duty cycle.

25 Claims, 10 Drawing Sheets

U.S. PATENT DOCUMENTS

| | | | |
|---|---|---|---|
| 5,025,122 A | 6/1991 | Howell | |
| 5,051,086 A | 9/1991 | Gellert | |
| 5,387,386 A | 2/1995 | Kirjavainen | |
| 5,403,540 A | 4/1995 | Brundage et al. | |
| 5,430,273 A | 7/1995 | Bogdanski et al. | |
| 5,456,870 A * | 10/1995 | Bulgrin | 264/40.6 |
| 5,571,436 A | 11/1996 | Gregg et al. | |
| 5,799,720 A | 9/1998 | Ross et al. | |
| 5,820,900 A | 10/1998 | McGrevy | |
| 5,947,887 A | 9/1999 | White et al. | |
| 5,955,120 A | 9/1999 | Deissler | |
| 5,997,778 A * | 12/1999 | Bulgrin | 264/40.1 |
| 6,120,714 A | 9/2000 | Allan et al. | |
| 6,197,437 B1 | 3/2001 | Bielec et al. | |
| 6,486,445 B1 | 11/2002 | Pendergraft | |
| 6,717,118 B2 | 4/2004 | Pilavdzic et al. | |
| 6,781,100 B2 | 8/2004 | Pilavdzic et al. | |
| 7,034,263 B2 | 4/2006 | Kagan | |
| 7,034,264 B2 | 4/2006 | Kagan | |
| 7,041,944 B2 | 5/2006 | Pilavdzic et al. | |
| 2002/0170696 A1 * | 11/2002 | Akers et al. | 164/113 |
| 2006/0197254 A1 | 9/2006 | Onishi | |
| 2008/0136066 A1 | 6/2008 | Taylor et al. | |

FOREIGN PATENT DOCUMENTS

| | | |
|---|---|---|
| GB | 772424 | 4/1957 |
| GB | 2081171 | 2/1982 |
| JP | 5-286018 | 11/1993 |
| JP | 6-335954 | 12/1994 |
| JP | 2003-071893 | 3/2003 |
| JP | 2003-297538 | 10/2003 |

* cited by examiner

SYNCHRONIZED TEMPERATURE CONTOL OF PLASTIC PROCESSING EQUIPMENT

This application claims priority to and the benefit of U.S. Provisional Application No. 60/966,378, filed Aug. 27, 2007, and U.S. Provisional Application No. 60/966,495, filed Aug. 28, 2007, the full disclosures of which are incorporated herein by reference.

BACKGROUND OF THE INVENTION

1. Field of the Invention

This invention relates generally to the heating of equipment used to process plastic material. More particularly, the invention relates to induction heating a metal barrel of the type used for injection molding of plastics.

2. Description of the Prior Art

Solid plastic feed material enters the feed end of a barrel and then is sheared, mixed and metered by a rotating screw, which forces the material in a molten state through a nozzle at the discharge end. To help melt the plastic, band-heaters, arranged on the barrel's outer surface, are heated from an electric power source.

The electrical circuitry of the band-heaters is usually arranged so that the barrel can be heated in multiple controllable zones along its length, with one thermocouple located in the barrel wall per zone to provide temperature measurement feedback.

As the unheated plastic feed material enters the barrel, the temperature of the barrel wall drops in the vicinity of the feed material inlet, resulting in a demand for heat in that zone.

Because of the relatively slow thermal response of band-heaters, conventional barrel temperature measurement and control hardware and software is not designed to detect or respond to the drop in barrel temperature that occurs each machine cycle. Cycle times typically range from 5 to 150 seconds and typically increase with part weight. Consequently, a conventional barrel temperature control using band-heaters is incapable of responding to any temperature variation having a period of a few minutes or less, whether the variation derives from the feed material's cyclical deposition in the barrel, or from more unpredictable factors such as cooling capacities, ventilation changes around the machine, changes in feed material properties such as moisture content, changes in mold design and capacity, and/or the machine setup. Because of this, on conventional band-heated applications, thermocouple depth within the barrel wall is often intentionally shallow, so that uncontrollable short-term temperature variations will go undetected.

AC induction has also been used to heat injection molding and extrusion barrels, by inducing eddy currents within the barrel wall to produce direct resistive heating of the barrel. By comparison, induction is typically capable of heating the barrel as fast as the introduction of cold feed material is able to cool it, so deeper thermocouple placement combined with induction heating will allow these temperature variations to be detected and controlled.

Simple control software can be configured so that induction heat is applied in a synchronized fashion, once per machine cycle as the cold feed material is introduced and the process temperature drops sufficiently below the target value to trigger a control output. However, induction heating systems added to existing injection molding machines must work with the machine's existing temperature control software, which typically provides duty-cycle outputs that prevent synchronized control.

Conventional temperature control software, whether resident in a PLC, PC or other microcontroller platform, usually provides one duty-cycled output per control zone that pulses power to the zone's band-heaters through a contact closure circuit, using relays or contactors. The power output interval used in a duty-cycle scheme is typically configurable and fixed, and is chosen to be a small fraction of the band-heaters' time-constant, typically less than 30 seconds, versus several minutes, and ideally, also is much shorter than the machine's cycle time.

An asynchronous control in which the control output interval is not equal to the machine cycle, uses the band-heaters' large thermal inertia to simulate a smooth constant power output over time, thereby permitting the use of inexpensive discrete controller outputs in lieu of expensive analog power controls. However, asynchronous control unfortunately prevents conventional temperature control software from taking advantage of induction's much faster response characteristics to add heat to the process synchronously with the need, i.e., or once per machine cycle. Instead, it forces control to be non-synchronous with the process, thereby increasing process temperature variability.

SUMMARY OF THE INVENTION

A system for processing plastic feed material includes a machine with a barrel and a screw that rotates in a repetitive cycle in the barrel. An induction winding encircles and extends along an outer surface of the barrel. A control system includes a controller that determines a duty cycle referenced to a length of the machine cycle in response to an error between a desired barrel temperature and a current barrel temperature. The controller electrically connects the power supply to the induction winding at least once during each machine cycle for a period whose length corresponds to the duty cycle.

The invention also contemplates a method for controlling the application of electric power to an induction winding using the machine described above for processing plastic feed material. The duty cycle being determined with referenced to a length of the machine cycle in response to an error between the desired barrel temperature and the current barrel temperature, and a power supply being electrically connecting to the induction winding at least once during each repetitive machine cycle for a period whose length corresponds to the duty cycle.

Induction heating applies more heat, in a smaller area, more rapidly, than band-heaters do, primarily due to band-heaters' thermal inertia and their operating temperature and reliability constraints. Therefore, induction heating is able to control the barrel temperature in a first zone along the barrel better throughout process disturbances, which include the cyclical addition of cold feed material in each machine cycle on injection molding machines, thereby reducing downstream process temperature variability.

A preferred embodiment may combine an induction heated barrel having a first temperature control zone, with one or more downstream zones heated by un-insulated or insulated band-heaters. The incremental cost increase of the induction heating system is less than the cost benefit of the energy savings provided by it, thereby improving the return on investment deriving from the induction system.

The invention allows heat to be generated by induction within the barrel wall once per machine cycle, in response to a duty-cycled control input from a conventional temperature controller that is not otherwise capable of synchronizing the heat addition with the machine cycle.

The induction power supply in this invention receives a discrete input that changes state once per machine cycle. For example, this input may be high when the plasticating screw is rotating and low when it is not rotating. The power supply uses this input to trigger power output to the induction-heating coil once per machine cycle. When triggered, power is transferred to the barrel wall once per machine cycle at the desired average rate by operating at a nominal output power for a variable, computed time increment. Alternatively, once triggered, power can be transferred to the barrel at the desired average rate by outputting for a nominal output period at a variable, computed output power level.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

Having generally described the nature of the invention, reference will now be made to the accompanying drawings used to illustrate and describe the preferred embodiments thereof. Further, these and other advantages will become apparent to those skilled in the art from the following detailed description of the embodiments when considered in the light of these drawings in which.

DESCRIPTION OF THE PREFERRED EMBODIMENT

Figure 1:
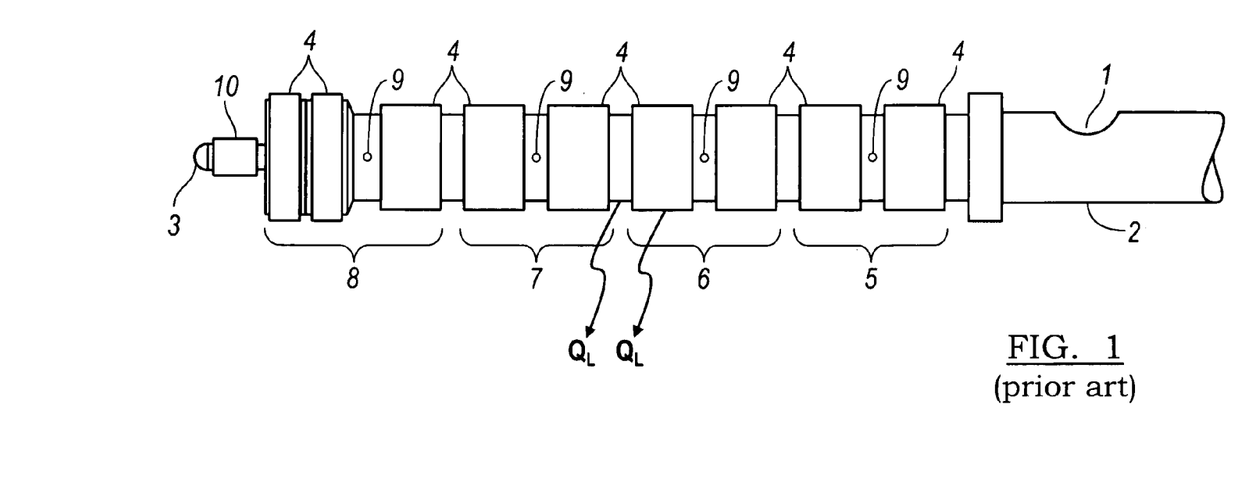
FIG. 1 illustrates an injection molding barrel heated by band-heaters.

Referring to FIG. 1, solid plastic feed material, typically in the form of pellets or powder, enters the feed end 1 of a barrel 2 for injection molding and extruding plastics, rubbers, carbon and like materials (hereinafter generally referred to as "plastic"). When entering the barrel, the temperature of the plastic feed material is low relative to a desired temperature during processing. The feed material then is sheared, mixed and metered by a screw that rotates within the barrel. The resulting molten material is forced out of the barrel under pressure through a nozzle or die at the discharge end 3 of the barrel 2.

To help melt the plastic, the barrel 2 is also heated with external electric resistance contact heaters 4, commonly referred to as band-heaters. Furthermore, the band-heater electrical circuitry is usually arranged so that the barrel 2 can be heated in multiple controllable zones 5, 6, 7 and 8 along the barrel's length. Usually three to six heating zones are used, each zone having one thermocouple 9 located in the barrel wall to provide measured temperature feedback. The nozzle or die at the discharge end 3 is heated and temperature controlled separately using one or more dedicated band-heaters 10.

Figure 2:
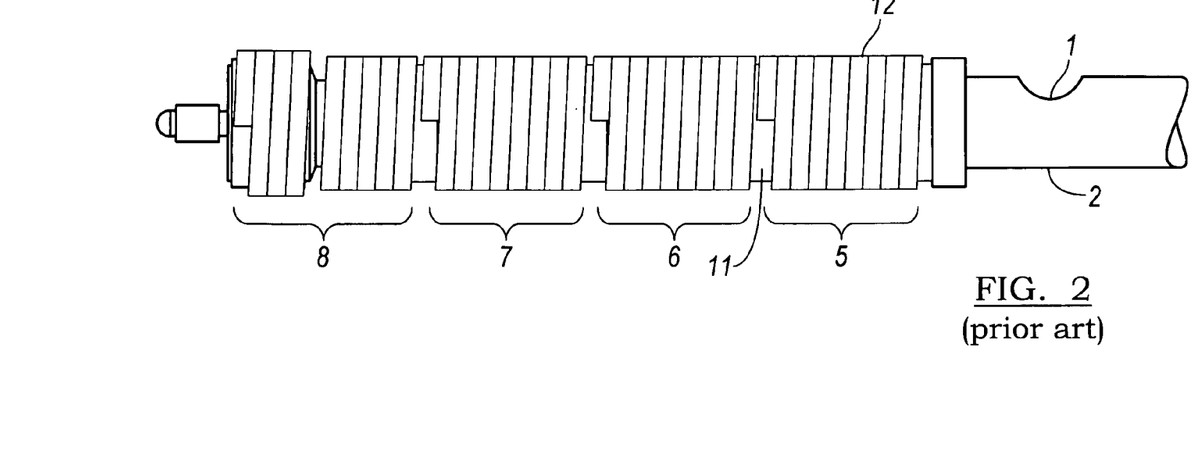
FIG. 2 illustrates the same injection molding barrel heated by electromagnetic induction.

AC induction can be used to heat injection molding and extrusion barrels by inducing eddy currents within the barrel wall to produce direct resistive heating of the barrel 2. Referring now to FIGS. 1 and 2, AC induction barrel heating systems employ a thermal insulating layer 11 interposed between the inductor windings 12 and the outer surface of the barrel 2 to reduce heat loss and protect the windings. The low-resistance windings 12 typically consisting of Litz wire to minimize winding heat generation, keeping the windings efficient. It is important to note that band-heaters 4 add significant thermal inertia to the system, retarding temperature control response, while induction barrel heating reduces energy consumption, shortens heat-up time, and enables tighter temperature control during process disturbances compared to the use of band-heaters.

The importance of the first zone 5 is explained with further reference to FIGS. 1 and 2. When the unheated plastic feed material enters the barrel 2, the barrel wall temperature drops in the first temperature control zone 5 nearest the feed material inlet at the feed end 1 causing a demand for heat in zone 5. The subsequent heat addition from band-heaters 4 or induction windings 12, combined with viscous heating of the feed material in the barrel (due to friction between the material and the barrel wall, as the screw wipes the material against the wall) supplies the heat needed to melt the material. Additional heat input is then needed primarily to compensate for heat losses "$Q_L$" to ambient from the exposed band-heater and barrel surfaces. Such heat losses occur if the barrel 2 is un-insulated, as is common with band-heaters. Band-heater surface heat losses "$Q_L$" to ambient are also usually much larger in the first zone 5 where they typically operate at a higher power level, and hence are hotter, leading to exponentially higher radiation and convection losses, and therefore much lower efficiency. Accordingly, as illustrated in FIG. 3, equipping the first zone 5 with induction heating equipment consisting of inductor windings 12 and an interposed layer of thermal insulation 11, therefore, eliminates a large portion of the total heat losses to ambient.

Induction heating applies more heat in a smaller area more rapidly than do band-heaters 4, primarily due to the band-heaters' thermal inertia and their operating temperature and reliability constraints. Therefore, induction heating is able to control the barrel temperature better throughout process disturbances, including the cyclical addition of cold material in each machine cycle on injection molding machines, thereby reducing downstream process temperature variability as well.

Figure 3:
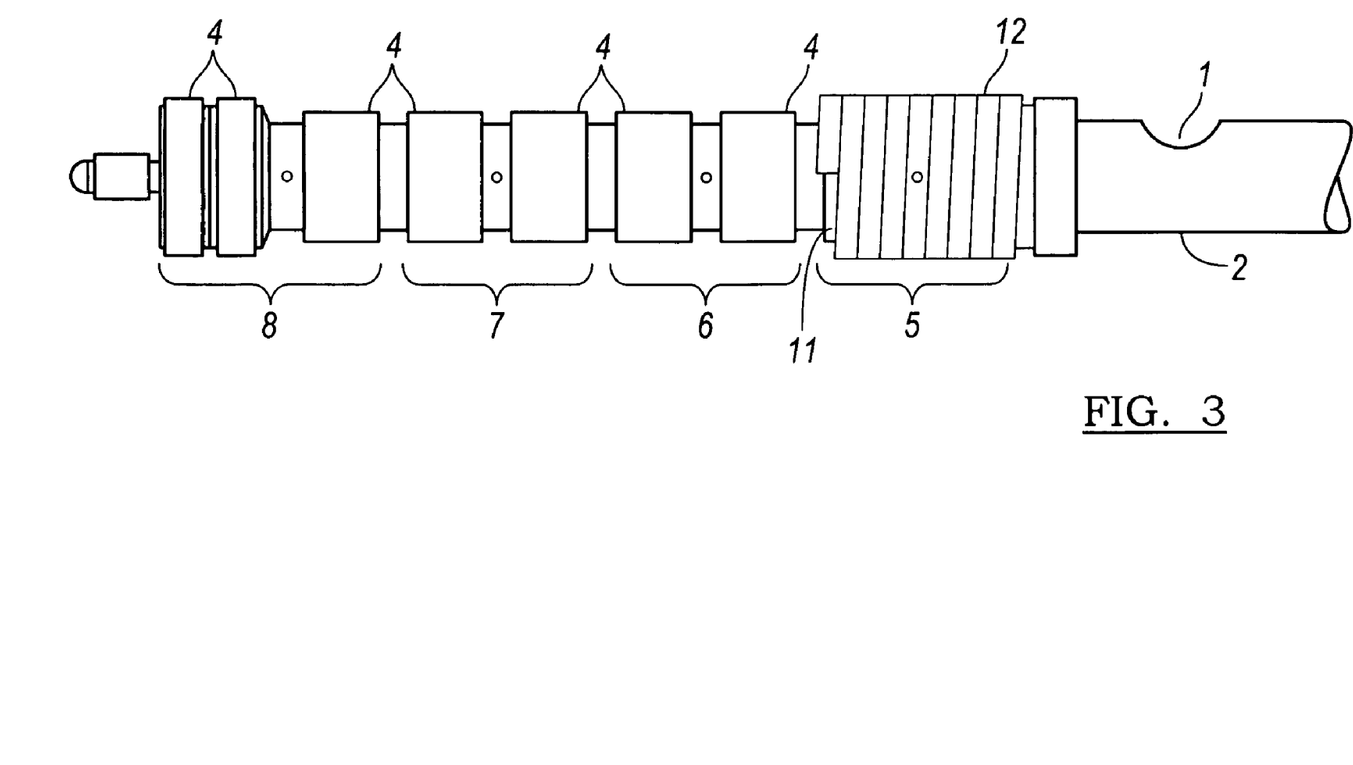
FIG. 3 illustrates the injection molding barrel heated by electromagnetic induction in a first zone and by un-insulated band-heaters in other zones.

Continuing to refer to FIG. 3, a preferred embodiment may use induction heating in the first zone 5 followed by heating with un-insulated band-heaters 4 in the downstream zones 6, 7, 8. The resulting hybrid-barrel heating system, which combines both induction and conventional contact resistance heating principles, saves a significant amount of energy, even though only one zone is equipped with efficient induction heating equipment.

Figure 4:
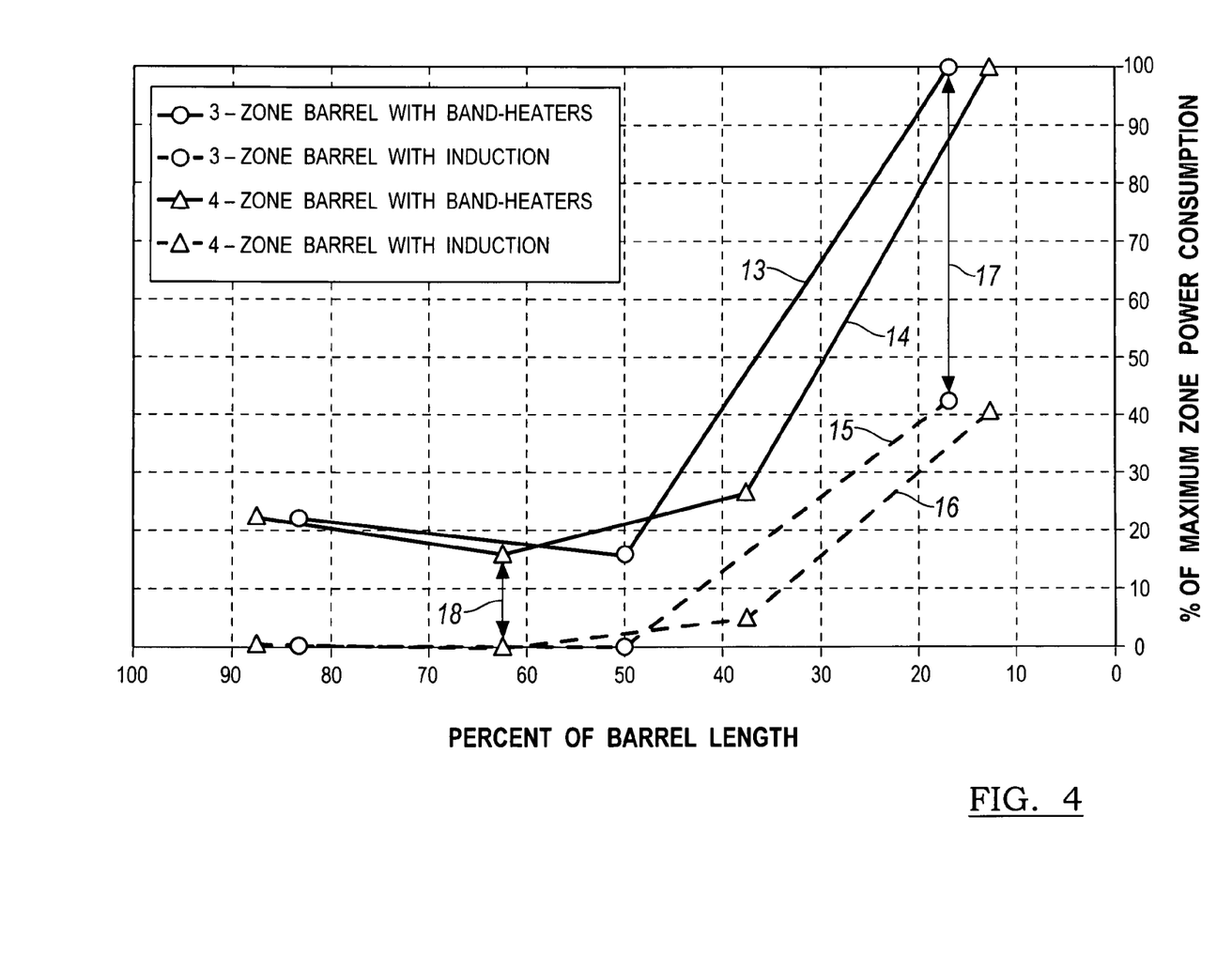
FIG. 4 is a chart showing typical heater power consumption achieved with band-heaters in comparison to induction windings on three-zone and four-zone barrel heating applications.

The comparative heating system power consumption curves 13, 14, 15, 16 of FIG. 4 relate to a multiple-zone injection molding barrel 2 with constant processing conditions, i.e., material throughput rate, control zone temperatures, etc. The three zone system includes an upstream heating zone 5 near the feed inlet 1, a downstream discharge zone 8 and a combined intermediate zone at 6, 7, located between zones 5, 8. The four zone system includes an upstream heating zone 5 near the feed inlet 1, a downstream discharge zone 8 and two intermediate zones 6, 7 located between zones 5, 8. The zones were heated by un-insulated band-heaters 4 (as illustrated in FIG. 1), and by insulated electromagnetic induction windings 12 (as illustrated in FIG. 2). The respective relative energy savings 17, 18 in each zone, achieved by eliminating the heat loss "$Q_L$" to ambient in each zone, shown in FIG. 4, is computed and plotted in FIGS. 5 and 6.

Figure 5:
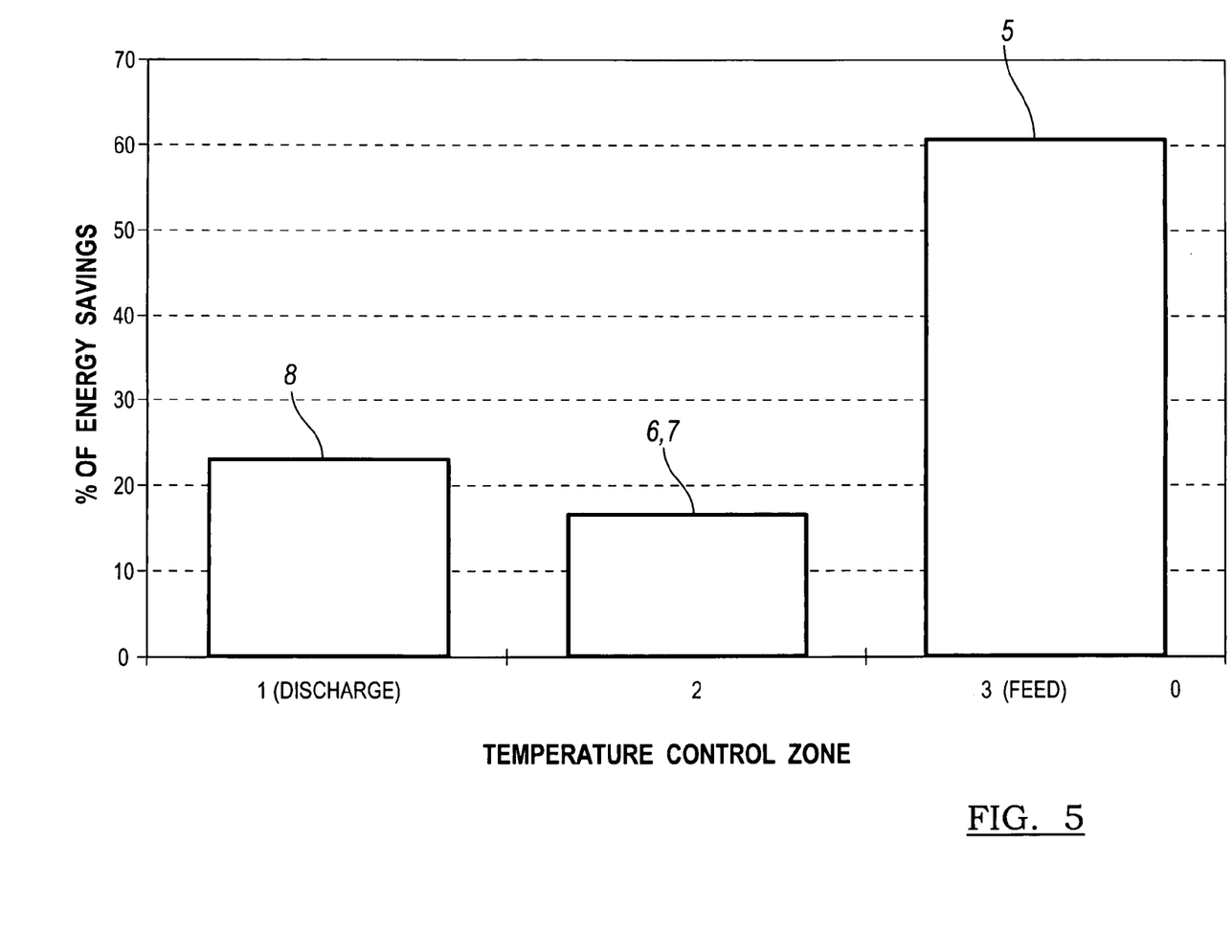
FIG. 5 is a chart showing the resulting energy saving using band-heaters and induction windings on a typical three-zone barrel heating application of the type described with reference to FIG. 3.
Figure 6:
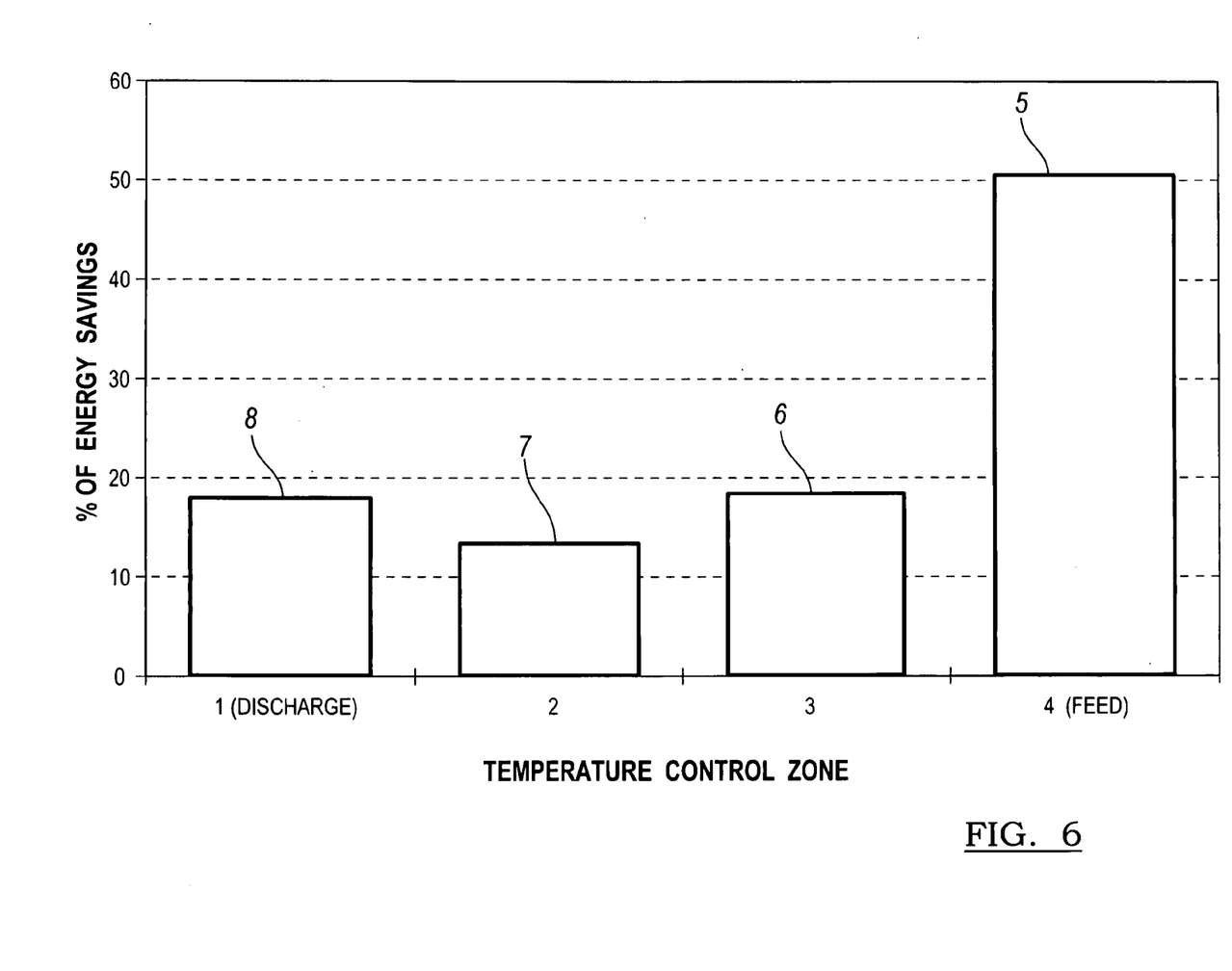
FIG. 6 is a chart showing the resulting power saving using band-heaters in comparison to induction windings on a typical four-zone barrel heating application of the type described with reference to FIG. 3.

The graphical results illustrated in FIGS. 5 and 6 indicate that replacing un-insulated band-heaters 4 with inductor windings 12 in only the first zone 5 delivers 50-60% of the energy savings that could be achieved if the entire length of the injection molding barrel 2 were equipped with induction heating windings 12, which would cost three to four times more than equipping just the first zone 5 with induction windings. The hybrid configuration illustrated in FIG. 3 reduces the initial induction equipment cost by about 66-75% for three-zone and four-zone systems, respectively, while only reducing the savings by about 40-50% for three-zone and four-zone systems, respectively. A reduction in the investment payback period of 45-50% results (i.e. 50%=(1−0.75)/(1−0.5)).

Figure 7:
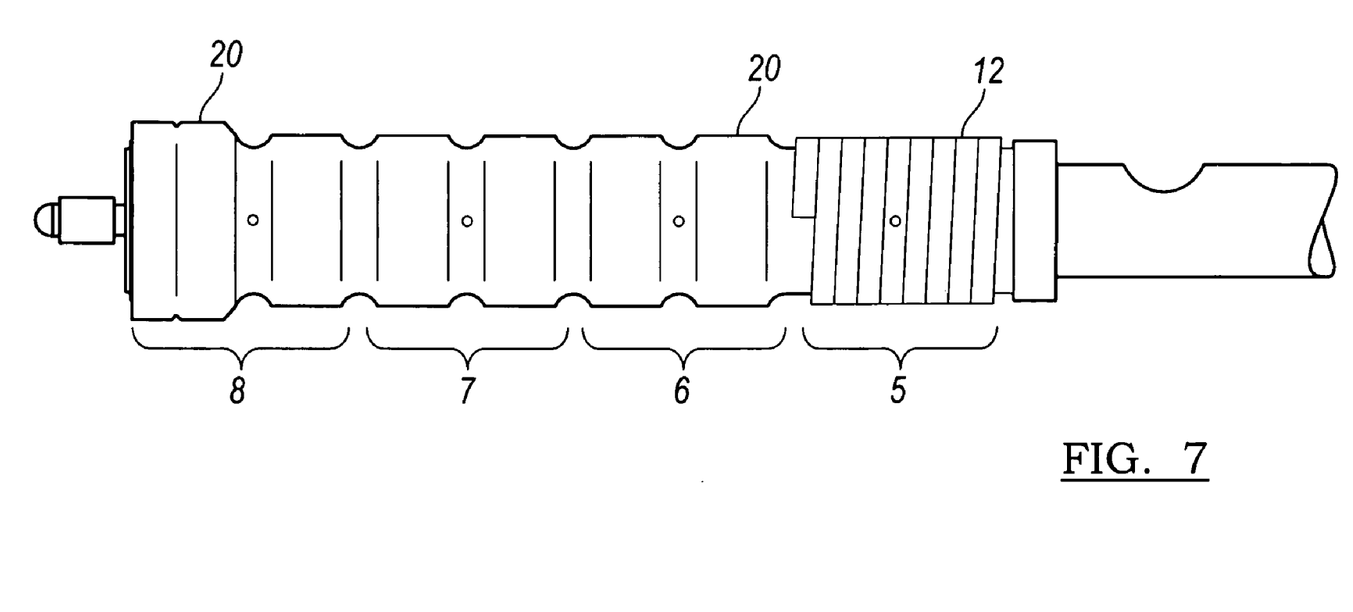
FIG. 7 illustrates the injection molding barrel heated by electromagnetic induction in a first zone and by band-heaters covered with thermal insulation in other zones.

In the embodiment illustrated in FIG. 7, induction heating is employed in zone 5, but the downstream zones 6, 7, 8 are heated with band-heaters 4. External thermal insulation 20 covers the band-heaters 4 and the outer surface of the barrel 2 in zones 6, 7, 8 to eliminate heat losses to ambient from exposed band-heater and barrel surfaces, so that even more energy savings can be achieved with minimal additional investment, i.e., only the cost of the added insulation 20.

Figures 8, 9A:
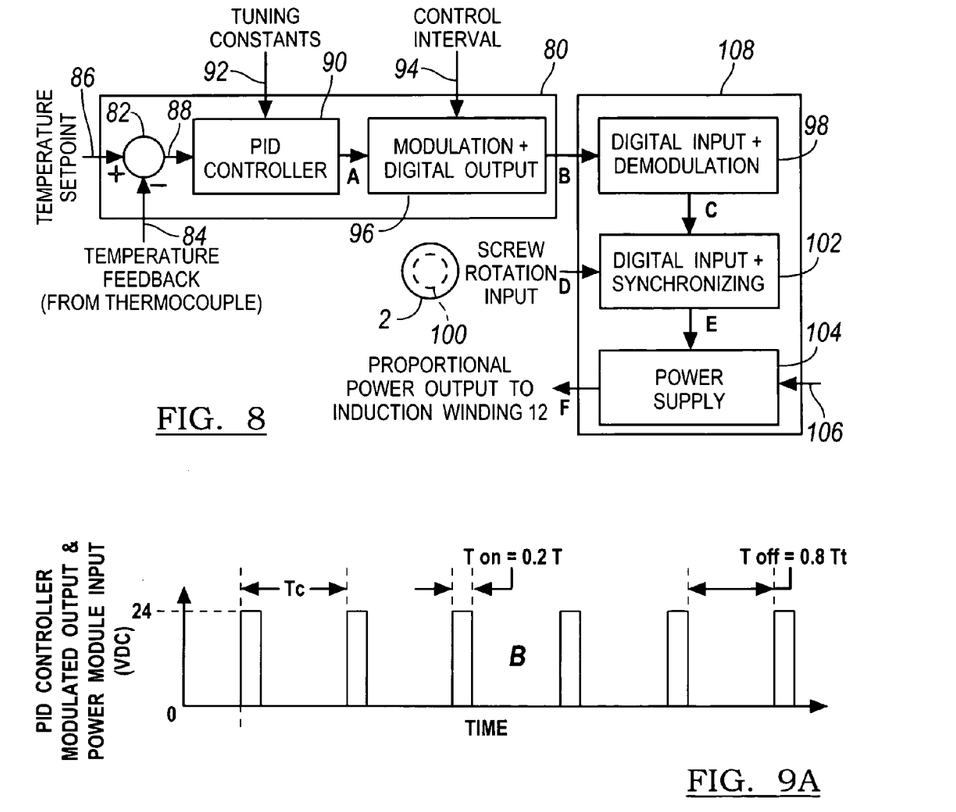
FIG. 8 is a schematic diagram of a control for an electric power supply to the induction windings.
FIGS. 9A through 9E are waveforms representing the input and output signals of the control of FIG. 8.

The induction power control 108 shown in FIG. 8 for an induction power supply outputs a proportional amount of heat energy to the induction windings 12 in zone 5 of the injection molding barrel 2 once per machine cycle, i.e., during a machine cycle time interval, in response to a duty-cycle control signal B received from a proportional temperature controller 80. Software module 98 for the control of the induction power supply demodulates the incoming duty-cycle control signal B, which in the example described here is a 24 VDC input, for some percentage of a time-base.

The induction power control allows heat to be generated by electromagnetic induction within the barrel wall once per machine cycle, in response to a duty-cycle control input from the temperature controller 80 synchronizing the heat addition with the machine cycle.

The temperature power controller 80 includes a summing junction 82, where a temperature feedback signal 84, representing the barrel temperature in zone 5, is subtracted from a reference signal 86, representing the desired setpoint temperature, which may be stored in electronic memory. In response to tuning constants 92, such as process gains, time constants and a time lag, a PID controller 90 produces an output A, which is a proportional value in a range between zero and 100 that is used to minimize the error signal 88. On the basis of a control interval 94 and the value A output by controller 90, software module 96 produces the duty cycle output signal B, which is supplied as input to induction power control 108.

Software module 98 demodulates duty cycle B and produces therefrom signal C, which is a proportional power setpoint by which the maximum available power is modified and provided to the inductor windings 12.

Figure 9B:
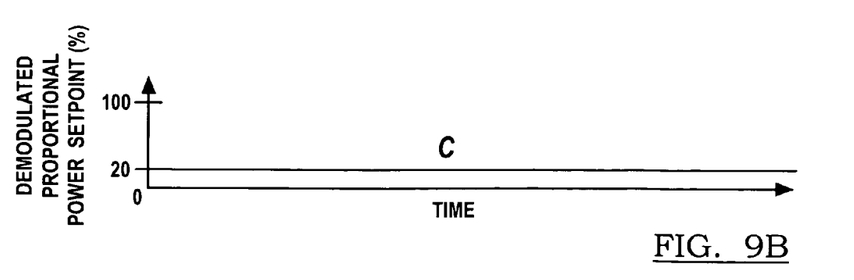
Figure 9C:
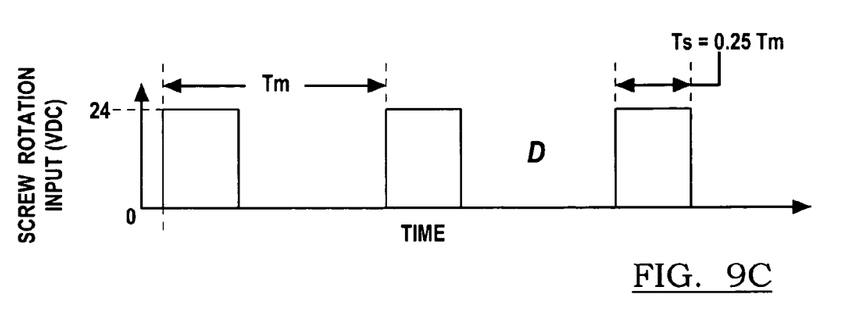
Figure 9D:
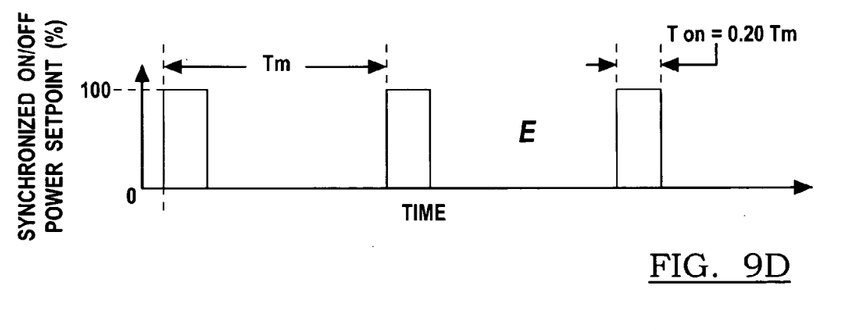
Figure 9E:
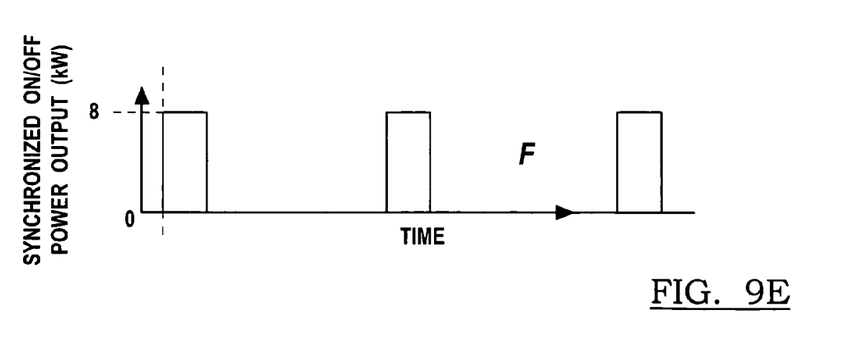

Signal D, whose period is equal to the machine cycle $T_m$, represents by its high amplitude the period during the machine cycle in which screw 100 rotates within barrel 2 and, by its low amplitude, the period during the machine cycle in which screw 100 is idle. In the example described here, the screw rotates during 25% of the machine cycle $T_m$. With reference to FIGS. 9C and 9D, it is important to note that the machine cycle $T_m$ is equal to the period between the beginning of successive additions of feed material into the barrel 2, and, therefore, corresponds to the product production rate of the processing equipment.

On the basis of information conveyed by signals C and D, software module 102 produces signal E, which is a synchronized ON/OFF power setpoint. Signal E is in phase or synchronized with the start of the machine cycle screw rotation and is high for the portion of the machine cycle period $T_m$ corresponding to the duty cycle and proportional value signal C. In the example described here and shown in FIG. 9A, the duty cycle is 20% and the amplitude of signal E is 100%, which corresponds to 24 VDC.

The power supply software module 104 receives as input the power set point 106, whose magnitude is 8 kW, and produces signal F, which is in-phase with and has the same frequency as signal E, and has the amplitude of the power set point 106.

In response to signal F, the power supply 104 provides 8 kW of AC power to induction winding 12 in phase with the machine cycle $T_m$ for 20% of the length of the machine cycle $T_m$ and having a frequency in a preferred range of 10-30 kHz. The power supplied to windings 12 is represented by signal F.

Figure 10:
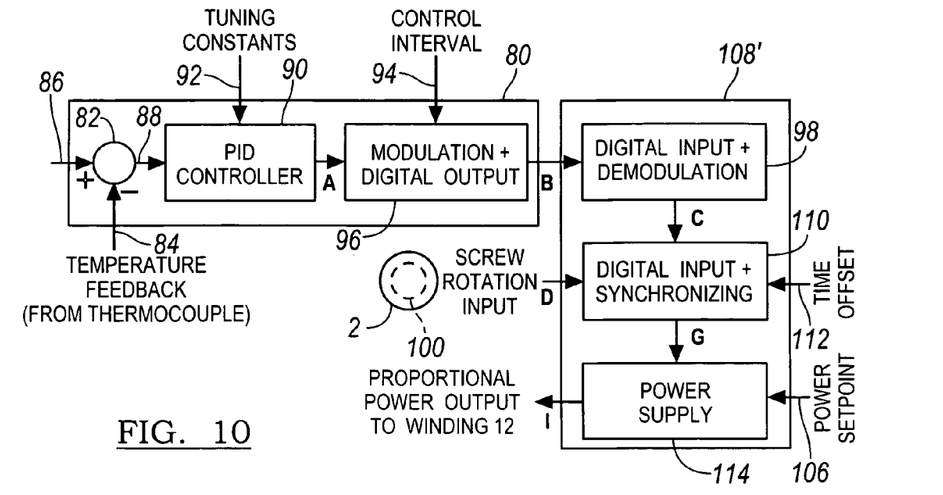
FIG. 10 is a schematic diagram of an alternate control for electric power supply to the induction windings.

An alternative induction power control 108' illustrated in FIG. 10 is structurally and functionally identical to the control of FIG. 8, except for software module 110 and power supply 114, which are described below. Further, signals A, B, C and D are identical to the corresponding signals of the control of FIG. 8.

Figure 11A:
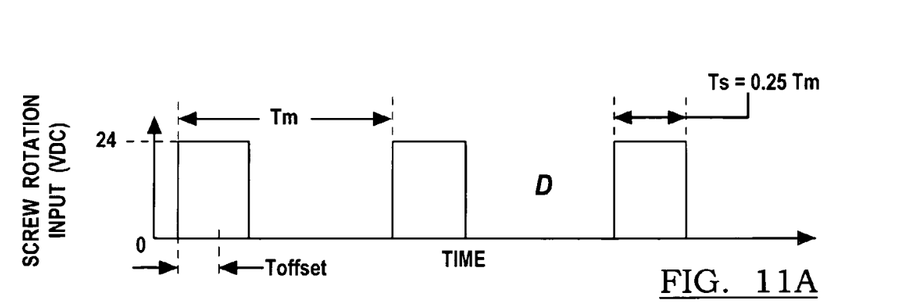
FIGS. 11A, 11B and 11C are waveforms representing signals produced by modules of the control of FIG. 10.
Figure 11B:
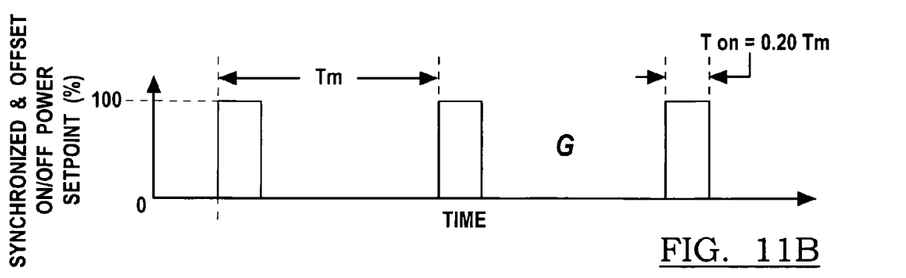
Figure 11C:
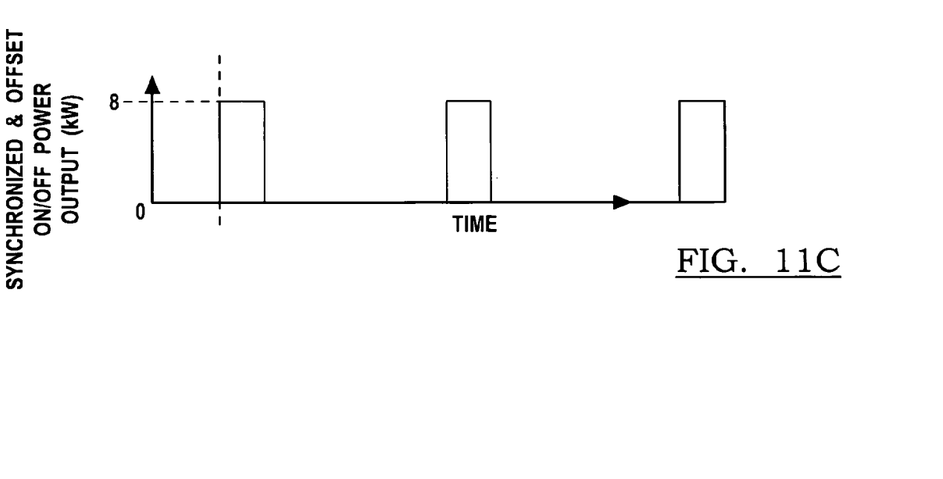

Software module 110 receives as input a signal 112 representing a time offset $T_{offset}$, i.e., the length of a delay period between the start of the machine cycle $T_m$ and the application of electric power to the induction windings 12. More specifically, on the basis of information conveyed by signals 112, C and D, software module 110 produces signal G, whose phase is delayed by the time offset $T_{offset}$ with respect to the start of machine cycle $T_m$, i.e. when screw rotation begins as shown in FIG. 11A, and is high for the portion of the period $T_m$ corresponding to the duty cycle or proportional value signal C.

Software module 114 receives as input the power set point 106, whose magnitude in this example is 8 kW, and produces output signal I, which is in-phase with and has the same frequency as signal G and has the amplitude of the power set point 106. In response to signal I, the power supply provides 8 kW of AC power to induction winding 12 for 20% of the length of the machine cycle $T_m$ delayed by the time offset $T_{offset}$ with respect to the start of the machine cycle.

Figure 12:
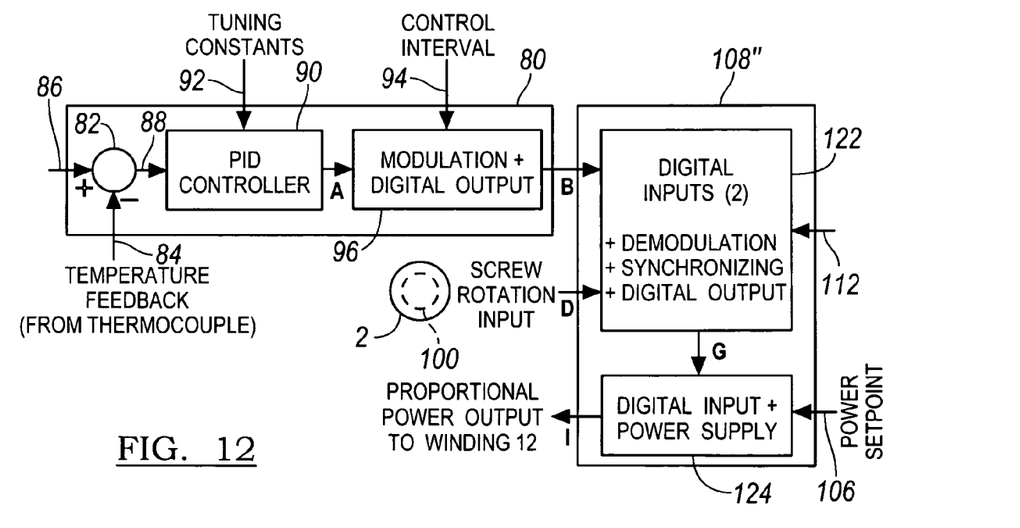
FIG. 12 is a schematic diagram of an alternate embodiment of the control for electric power supply to the induction winding.

Another induction power control 108" control illustrated in FIG. 12 is structurally and functionally identical to the control of FIG. 8, except for software module 122 and power supply 124. Signals A, B and D of the control of FIG. 12 are identical to the corresponding signals of the control of FIG. 8. Specifically, module 122 receives as input signals B, D and 112, which represent a time offset $T_{offset}$ (i.e. as previously stated, the length of a delay period between the start of the machine cycle $T_m$ and the application of electric power to the induction windings 12). On the basis of information conveyed by signals 112, B and D, software module 122 produces signal G, whose phase is also delayed by the time offset $T_{offset}$ with respect to the start of machine cycle $T_m$ and is high for the portion of the period $T_m$ corresponding to the duty cycle signal C.

Like power supply 114, power supply 124 (which also receives as input the power set point 106 whose magnitude in this example is 8 kW) produces output signal I, which is in-phase with and has the same frequency as signal G and has the amplitude of the power set point 106. In response to signal I, the power supply provides 8 kW of AC power to induction winding 12 for 20% of the length of the machine cycle $T_m$ delayed by the time offset $T_{offset}$.

Adding a time offset or phase delay in the application of electric power to the windings 12 at the start of each machine cycle, is an example of an enhancement that can be applied by controllers, such as those described here, to the improve the processing of plastic materials.

It should be noted that the present invention can be practiced otherwise than as specifically illustrated and described, without departing from its spirit or scope. It is intended that all such modifications and alterations be included insofar as they are consistent with the objectives and spirit of the invention.

What is claimed is:

1. An apparatus for processing plastic feed material comprising:
   a machine that includes a barrel and a screw that rotates in the barrel during repetitive machine cycles;
   an induction winding encircling and extending along an outer surface of the barrel; an electric power supply; and
   a controller measuring a barrel temperature that synchronizes a heating cycle including having a supply of energy from the electric power supply to the induction winding with each machine cycle, and controls a magnitude of the electric power supplied during one of the machine cycles in response to a barrel temperature error.

2. The apparatus of claim 1, wherein the controller is further configured to determine a duty cycle in response to the barrel temperature error comprising a difference between a desired barrel temperature and the barrel temperature.

3. The apparatus of claim 1, wherein the controller is further configured to initiate said supply of electric energy to the induction winding at a beginning of the machine cycle.

4. The apparatus of claim 1, wherein the controller is further configured to initiate said supply of electric energy to the induction winding while the screw is not rotating.

5. The apparatus of claim 1, wherein the controller is further configured to initiate said supply of electric energy to the induction winding following a delay that begins when the screw begins to rotate.

6. The apparatus of claim 1, wherein the controller is further configured to supply electric energy to the induction winding for a period during which the screw rotates.

7. The apparatus of claim 1, wherein the controller is further configured to supply electric energy to the induction winding for a period during which feed material is injected into the barrel.

8. The apparatus of claim 1, wherein the controller is further configured to:
   determine a duty cycle in response to the barrel temperature error; and
   initiate said supply of power to the induction winding for a period whose length corresponds to the duty cycle.

9. The apparatus of claim 1, further comprising a thermal insulation that is interposed between the induction winding and the barrel.

10. The apparatus of claim 1, further comprising:
    a thermal insulation interposed between the induction winding and the barrel; and
    a band heater extending along an outer surface of the barrel and located downstream from the induction winding.

11. The apparatus of claim 10 further comprising a second thermal insulation that covers the band heater.

12. A system for processing plastic feed material comprising:
    a machine that includes a barrel and a screw that rotates in the barrel during at least a portion of a repetitive machine cycle;
    an induction winding encircling and extending along an outer surface of the barrel;
    an electric power supply; and
    a controller that synchronizes a heating cycle including having a supply of electric energy from the electric power supply to the induction winding with a machine cycle, an initiation of said supply of power being delayed relative to a beginning of the machine cycle, and controls a magnitude of said power supplied during the machine cycle in response to a barrel temperature error.

13. The system of claim 12, wherein the controller is further configured to initiate said supply of electric energy at a desired magnitude to the induction winding during a duty cycle which begins with the start of an interval of a mechanical operation of the machine cycle.

14. The system of claim 12, wherein the controller is further configured to initiate said supply of electric energy to the induction winding at a beginning of an interval of operation that begins when the screw begins to rotate during the machine cycle.

15. The system of claim 12, wherein the controller is further configured to initiate said supply of electric energy to the induction winding at a beginning of an interval that follows a delay that begins when the screw begins to rotate.

16. The system of claim 12, wherein the controller is further configured to supply electric energy to the induction winding for a period during which the screw rotates.

17. The system of claim 12, wherein the controller is further configured to supply electric energy to the induction winding while feed material is injected into the barrel.

18. The system of claim 12, further comprising:
    a thermal insulation interposed between the induction winding and the barrel; and
    a band heater extending along an outer surface of the barrel and located downstream from the induction winding.

19. A method for controlling the application of electric power to an induction winding of a machine for processing plastic feed material that includes a barrel and a screw that rotates in a repetitive machine cycles in the barrel, comprising the steps of:
    determining a barrel temperature error;
    synchronizing a heating cycle including having a supply of electric energy from the electric power supply to the induction winding with each machine cycle; and reducing the barrel temperature error by controlling a magnitude of said electric energy supplied during one of the machine cycles.

20. The method of claim 19 further comprising the step of:
initiating said supply of electric energy when the screw begins to rotate during the machine cycle.

21. The method of claim 19 further comprising the step of:
initiating said supply of electric energy following a delay period that begins when the screw begins to rotate during the machine cycle.

22. An apparatus for processing plastic feed material comprising:
a machine that includes a barrel and a screw that rotates in the barrel during repetitive machine cycles;
a heating element encircling and extending along an outer surface of the barrel;
an electric power supply; and
a control system operatively connected to the heating element, the power supply and the machine, and including a controller that synchronizes a heating cycle including having a supply of electric energy from the electric power supply to the heating element with a start of each of the machine cycles, and controls a magnitude of said electric energy supplied to the heating element during each machine cycle, said magnitude of electric energy varying with a barrel temperature error.

23. The apparatus of claim 22, wherein the controller initiates said supply of electric energy to the heating element in-phase with the start of each machine cycle.

24. The apparatus of claim 22, wherein the controller supplies said electric energy to the heating element during a period whose start is delayed relative to the start of each machine cycle.

25. The apparatus of claim 1, wherein a magnitude of said electric energy supplied to the induction winding during a machine cycle varies with a magnitude of the barrel temperature error.

* * * * *